United States Patent

Hocking et al.

[15] 3,697,942
[45] Oct. 10, 1972

[54] EARLY WARNING BRAKE FAULT DEVICE AND SYSTEM

[72] Inventors: Loren P. Hocking, East Detroit; Louis B. Lotti, St. Clair Shores, both of Mich.

[73] Assignee: Benjamin W. Colman, Huntington Woods, Mich. ; a part interest

[22] Filed: Aug. 19, 1971

[21] Appl. No.: 172,990

[52] U.S. Cl..................................340/52 C, 200/83
[51] Int. Cl................................................B60t 17/22
[58] Field of Search.........340/52 R, 52 B, 52 C, 242; 200/82, 83

[56] References Cited

UNITED STATES PATENTS

| 3,560,918 | 2/1971 | Lewis et al. | 340/52 C |
| 3,450,853 | 6/1969 | Snyder | 340/52 C X |

*Primary Examiner*—Alvin H. Waring
*Attorney*—Benjamin W. Colman

[57] ABSTRACT

An early warning system in a motor vehicle having a hydraulic brake system to signal potential brake failure due to a loss of brake fluid from the brake system, or to excessive wear of lining on the brake shoes or disc pads at the wheels. The loss is measured as a volume loss of brake fluid, by a magnetically actuated reed switch structure responsive to a control magnet positioned in the brake fluid reservoir at a position below the reed switch to close the same when the brake fluid has reached a predetermined lower level.

21 Claims, 9 Drawing Figures

PATENTED OCT 10 1972 3,697,942

INVENTORS
LOREN P. HOCKING &
LOUIS B. LOTTI

BY Benjamin W. Colman

ATTORNEY

INVENTORS
LOREN P. HOCKING &
LOUIS B. LOTTI
BY
ATTORNEY

EARLY WARNING BRAKE FAULT DEVICE AND SYSTEM

A preferred embodiment of the invention involves a signalling device and system embodied in the master brake cylinder device currently in use, the cover for the master brake cylinder housing being slightly modified. The device comprises a flexible diaphragm or membrane between the master cylinder housing and its cover, a magnetically controlled reed switch secured within the chamber formed by the cover and the diaphragm, and a control magnet disposed within the brake fluid reservoir to coercively effect the function of the reed switch if the brake fluid level lowers to a line at which the coercive effect of the control magnet closes the reed switch and the circuit to a signalling lamp.

The early warning signalling of brake fluid loss in the system of this invention achieves two important goals. First, the vehicle operator is warned either that an undue volume of brake fluid has leaked out of the brake system, or secondly, that the linings on the brake shoes or disc pads are worn down to a dangerously low measure. Both of these conditions will produce decrease in the volume of brake fluid in the master cylinder reservoir. Therefore, a signalling device and system directly responsive to such volume loss will provide the vehicle operator with a warning before brake failure actually occurs.

In currently designed and available brake failure warning systems, the pressure responsive brake signal light in the driver compartment of the vehicle is adapted to be energized if and only if the brake fluid in the master cylinder unit and/or the brake system has been substantially completely lost, and the vehicle operator is depressing the brake pedal to apply pressure to the brake fluid. Of course, in such condition, the vehicle is without braking power and the operator can no longer control deceleration of the vehicle. A signal light made visible at this point provides the operator with no protection, and the warning system is wholly inadequate to the purpose for which it was designed.

The invention disclosed in this application provides an early warning brake fault device and system that signals a predetermined relatively small amount of brake fluid loss, long before there could be an ultimate failure of braking power. The invention further provides for a relatively simple, low cost and minor modification of the master brake cylinder structure which forms a part of the warning signalling system. A further object of the invention is the provision of a magnetic element mounted in a substantially fixed position within the brake fluid reservoir to coercively effect closing of a reed switch supported upon the diaphragm in a chamber above the brake fluid level in the reservoir. Yet another object is the provision of a reed switch secured upon the diaphragm which falls with the brake fluid level in the reservoir. A further object is to adapt the inventive device to existing structures and utilize the electric power, brake signalling lamp, and at least a portion of the circuitry currently installed in motor driven vehicles, whereby the over-all cost of the inventive system is substantially decreased, requiring only slight modification of the present master cylinder cover and brake signalling circuit.

Reference is made to our co-pending application Ser. No. 150,522, filed June 7, 1971 for "Early Warning Brake Fault System" for a disclosure of the structural environment in which the master brake cylinder is generally connected.

Various further and more specific objects, features and advantages of the invention will appear from the description given below, taken in connection with the accompanying drawings, illustrating by way of example preferred forms of the invention. Reference is here made to the drawings annexed hereto and forming an integral part of this specification, in which FIG. 1 is a vertical sectional view of a master brake cylinder embodying the inventive device.

Figure 1:
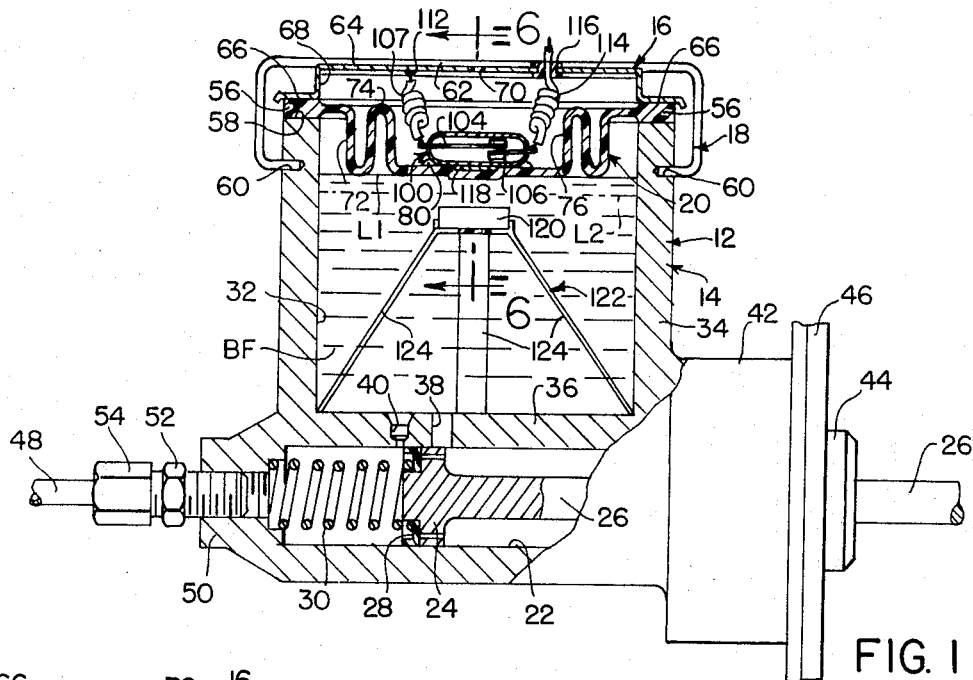
Figure 2:
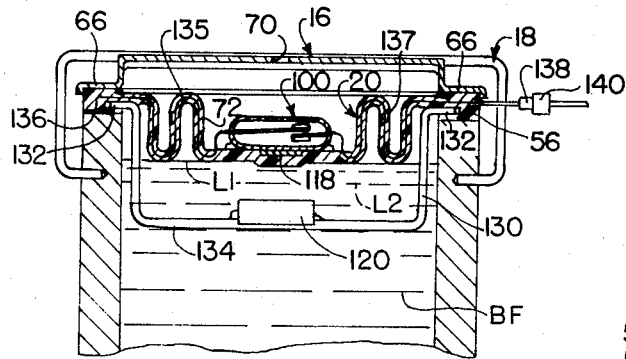
FIG. 2 is a view similar to FIG. 1 illustrating a slightly modified arrangement of the components of the inventive device.
Figure 3:
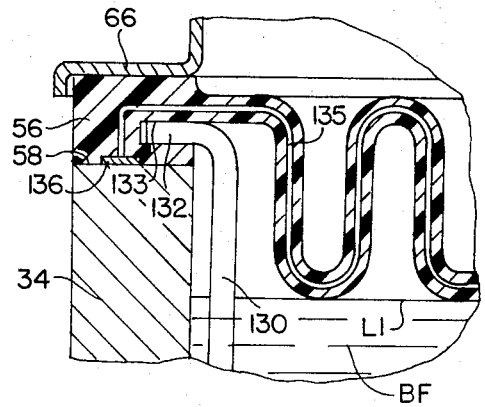
FIG. 3 is a fragmentary enlarged vertical sectional view of the left-hand portion of the master cylinder housing, diaphragm and cover as illustrated in FIG. 2.

As illustrated in several views of the drawing, particularly in FIGS. 1, 2 and 3, the master cylinder 12 comprises a housing 14, a cover 16, a cover hold-down ring 18, a relatively flexible resilient diaphragm or membrane 20 disposed intermediate the housing and the cover, a brake fluid cylinder 22 containing a piston 24 direct connected by a drive link or lever 26 to a source of mechanical, hydraulic or pneumatic power (not shown) for advancing the brake piston in its cylinder, a piston seal 28, a biasing spring 30 for the piston, and brake fluid BF in the reservoir 32.

The master brake cylinder housing 14 comprises a body portion 34 and a bottom wall 36, the brake fluid in the reservoir 32 flowing to the brake cylinder 22 through a by-pass port 38 and an inlet port 40.

The master cylinder housing 14 at its boss or hub 42 is secured by a fitting 44 to a supporting member 46, which generally comprises panel materials forward of a brake pedal or a power assist unit which in turn is usually mounted upon panel materials. A brake fluid conduit 48 communicating with the brake cylinder 22 is secured to the housing body hub section 50 by fittings 52 and 54 of currently conventional construction and practice.

The cover 16, overlying the housing and reservoir 32, is secured upon the peripheral edge 56 of the diaphragm 20 at the edge 58 of the housing body 34 by the retainer clamp ring 18 which has its ends pivotally disposed in blind holes 60,60 at opposite sides of the housing body 34. The wire clamp ring 18 holds the cover 16 compressively upon the peripheral edge 56 of the diaphragm 20. The cover is suitably grooved longitudinally on its top side to receive and seat the web or mid-portion 62 of the clamp ring 18.

The cover 16 comprises a body 64, generally inverted dish or cup-shaped, with an outwardly directed flanged edge 66 adapted to overlie and seat upon the peripheral edge 56 of the diaphragm 20. The cover body 64 and the diaphragm 20 form a chamber 68, the cover body being provided with an opening 70 to admit air and atmospheric pressure to the chamber 68.

The diaphragm 20 is an integrally formed unitary member preferably made of a substantially resilient flexible rubber or plastic type composition and comprises the peripheral edge 56 and a membrane or body portion 72 arranged with folds as annular upstanding ribs 74 to provide a central cup or cavity 76 within which the reed switch 100 is secured by an adhesive 80 or by other suitable securing means. The diaphragm 20 is adapted to seal off the brake fluid reservoir 32 from the atmosphere which enters through the port 70 and fills the chamber 68 so that atmospheric pressure is always present upon the diaphragm 20. The resilient flexible rubber or plastic type composition material from which the diaphragm 20 is preferably made includes the neoprene rubber-base materials which are substantially impervious to chemical decomposition by the brake fluids normally used in motor vehicle brake systems and upon which the diaphragm body 72 is designed to rest or float.

Figure 5:
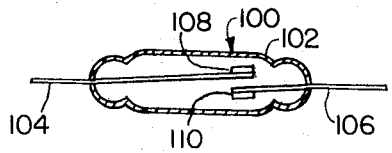
FIG. 5 is a side elevational view of a reed switch adapted to be used in the circuitry of the brake signalling system of this invention.

As seen particularly in FIG. 5, the reed switch 100 comprises an outer encapsulating shell or housing 102, reed conductors 104 (ground) and 106 (current) having their distal ends or contact points 108 and 110 respectively arranged in overlying and normally spaced apart and open relationship. The reed switch disclosed herein is a standard conventional magnetic reed switch of normally open construction. The flexible insulated conductor 107, connected to reed conductor 104 (FIG. 1) is secured to the cover body 64 at 112, and grounded through the cover body 64, the clamp down retainer ring 18 and the housing body 34. The conductor 106 is connected to the flexible insulated conductor 114 and passes through the grommet 116 secured in a suitable opening through the cover body 64. The flexibility of conductors 107 and 114 should be appreciable, to enable the diaphragm body 72, with reed switch 100 attached, to move with minimum restriction.

Figure 6:
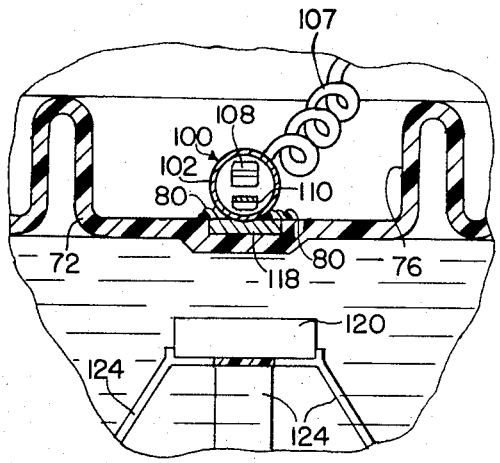
FIG. 6 is a transverse vertical sectional view taken substantially on the line 6—6 of FIG. 1.
Figure 7:
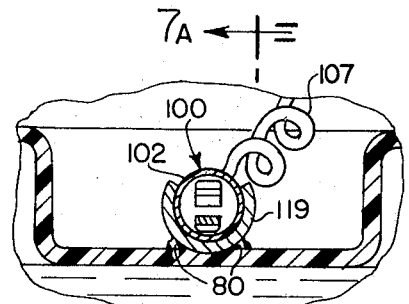
FIG. 7 is a view similar to FIG. 6, illustrating a slight modification of the device in the reed switch area.
Figure 7A:
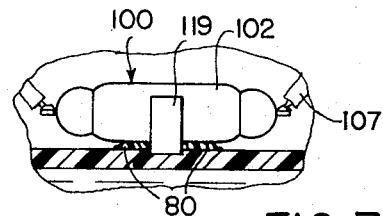
FIG. 7a is a vertical substantially elevational view taken substantially on the line 7a—7a of FIG. 7.

As illustrated particularly in FIGS. 6 and 7, the reed switch 100 is optionally secured upon an iron or steel pad 118 (FIGS. 1, 2 and 6), or with an iron or steel clip 119 partially encircling the reed switch housing 102 (FIG. 7). The magnetically influenced iron or steel pad 118 or clip 119 enables the control magnet 120 to substantially effect a snap action upon the reed switch when it reaches the predetermined lower lever $L_2$ and comes substantially within the coercive magnetic field of the control magnet 120. If such pad or clip is used in the device, a fluttering or variable vertical movement above the control magnet is substantially eliminated.

The control magnet 120 for the reed switch 100 can be arranged in the brake fluid reservoir in one of several ways, two of which are illustrated in FIGS. 1 and 2. In FIG. 1, it will be noted that the control magnet 120 is supported upon a frame 122, of suitable plastic or non-magnetic metallic materials, having legs 124 arranged to rest upon and be suitably secured to the bottom wall 36 of the reservoir adjacent the side of the housing body 34. The control magnet 120 is positioned below and substantially in alignment with the reed switch and in biasing attitude thereto when the reed switch 100 and its supporting diaphragm body 72 are lowered upon the brake fluid to a line $L_2$ where the coercive effect of the control magnet influences the reed switch contact points 108 and 110 toward each other to close a circuit illustrated in FIG. 4.

An alternate support for the control magnet 120, illustrated in FIG. 2, comprises a plastic or non-magnetic metallic web or strip support member 130 having its ends 132,132 secured in the peripheral edge portion 56 by means of recesses 133,133 adapted to receive and firmly retain the support member ends 132, 132 securely therein, and in intermediate web portion 134 upon which the control magnet 120 is secured by adhesive or other suitable means, for coercive relationship to the reed switch 100 when the reed switch is lowered into its magnetic field. Although the supporting member 130 illustrated in FIG. 2 is shown in connection with a reed switch having conductors arranged in a fashion different from that illustrated in FIG. 1, it will be understood of course that the control magnet support member 130 is the full equivalent of the support frame 122. In either instance, the control magnet 120 is positioned below the reed switch 100 a predetermined distance such that when the brake fluid level in the reservoir 32 falls to a line $L_2$ where an early warning signal should be given the operator of the vehicle, the magnetic influence of the control magnet 120 will close the reed switch contact points 108 and 110, and the electrical circuit to a signalling light.

Figure 4:
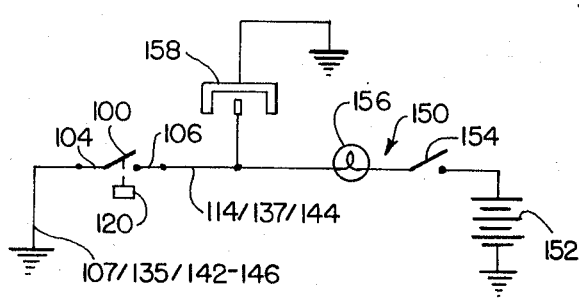
FIG. 4 is a schematic wiring diagram of electrical circuitry in which the inventive device forms a component element.

A modification for conduction from the reed switch conductors 104 and 106 is illustrated in FIGS. 2 and 3, wherein the flexible grounding conductor 135 and the flexible current conductor 137 (connected to the switch conductors 104 and 106 respectively) are molded into the insulating body 72 of the diaphragm 20 such that the grounding conductor 135 terminates in a grounding pad 136 adapted to engage and ground upon the housing edge 58 at the underside of the diaphragm peripheral edge portion 56, and the conductor 137 issues laterally from the side of edge portion 56 through to a connecting fastener member 138 adapted to be coupled with a second fastener member 140, for current conduction to the lamp 156 in the electrical circuit illustrated in FIG. 4.

Figure 8:
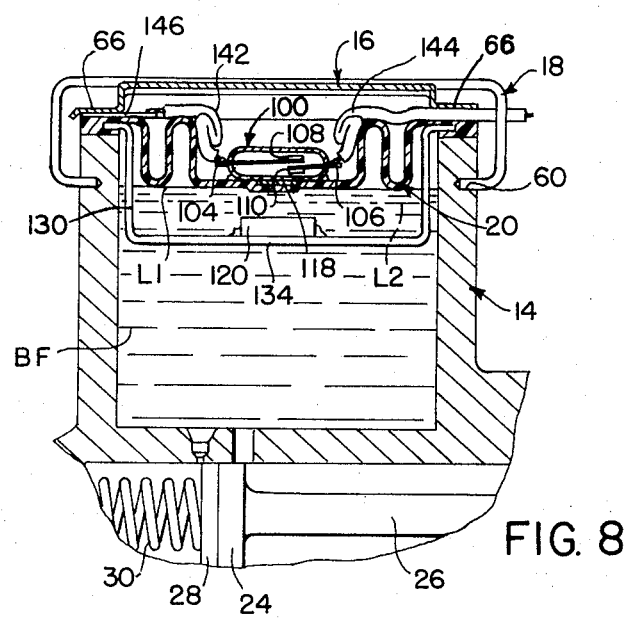
FIG. 8 is a view substantially similar to that illustrated in FIGS. 1 and 2, showing a further modification of the inventive device.

As illustrated particularly in FIG. 8, a further simplified modification of the device illustrated in FIGS. 1 and 2 provides for the connection of the reed switch contact conductors 104 and 106 to flexible insulated conductors 142 and 144 respectively, conductor 142 being connected to and terminating in a ground strap 146 which makes grounding contact (at the left) with and through the cover peripheral edge 66, current conductor 144 with its insulating covering extending under the peripheral cover edge 66 (at the right) upon the flexible resilient diaphragm edge portion 56 to a point beyond the cover and brake cylinder housing 34 for direct connection to the differential switch 158 or to another conductor which is connected in turn to the differential switch. The advantage of this modification is that a ground connection can be made by contact through the cover 16, the clamp ring 18 and the master brake cylinder housing 12 without soldering the ground connector to the cover. The current conductor 144, with its insulating covering, merely passes under the cover body edge 66 to issue into the area where connection can be made, directly or indirectly, in the electrical circuitry 150. The control magnet 120 is shown arranged as in FIGS. 2 and 3, but the equivalent arrangement of the control as in FIG. 1 may also be used.

The electrical circuit 150 comprises the vehicle battery energy source 152, the vehicle engine ignition switch 154, the signalling lamp 156, a differential switch 158, and the reed switch and control magnet device 100/120. The power battery, ignition switch, signal lamp and differential switch are all provided in a circuit in most motor vehicles according to current conventional practice. The addition of the reed switch and control magnet device in the system disclosed to that circuitry provides for an early warning of brake fault to which the instant invention is directed. It will be recognized that the brake signal lamp 156 and the differential switch 158, currently installed in automobiles and similar motor-driven vehicles, are made use of and connected in the signalling circuit of the inventive system herein disclosed.

Energized by the automobile battery 152, the ignition switch 154 being closed, the brake signal lamp 156 will light up when a predetermined amount of brake fluid BF leaks out of the brake system causing the reed switch contacts 108 and 110 to close under the influence of the control magnet 120 when the reed switch reaches the predetermined lower level $L_2$. A loss of brake fluid, at the present time, is not signalled until the fluid is substantially exhausted from the master cylinder reservoir. At that point, of course, the vehicle operator has lost braking power substantially altogether. He can no longer control deceleration of his vehicle, and the effective purpose to which the brake signal light is directed has now been achieved, but too late.

The operation of the inventive device and system hereindisclosed proceeds on the premise and to the end that the vehicle operator is given early and advance warning of either a predetermined appreciable loss of brake fluid through leakage and/or a substantial reduction in wear of the brake lining on the brake shoes or disc pads, the latter condition requiring substantially more brake fluid to advance the brakes to engagement and braking effect.

When the brake fluid is at the relatively high level $L_1$ indicated immediately under the diaphragm body 72 in solid line, and there is no leakage in the brake lines, only a relatively small amount of brake fluid is displaced from the reservoir into the brake lines, the same being true when the brake linings on the brake shoes and/or the disc pad faces are substantially thick and adequate for substantial braking action. Under the action of the brake pedal, the master cylinder or piston forces brake fluid into the conduit 48 to the brake cylinders, reducing the fluid level in the reservoirs. This function tends to create a vacuum under the diaphragm, allowing atmospheric pressure to force the diaphragm to bear directly upon the brake fluid. But when brake fluid leaks out of the hydraulic brake system of lines at any point, it will be materially reduced in the master cylinder reservoir, as for instance to the broken line $L_2$, and the body of the diaphragm will assume a much lower position. In such attitude the control magnet 120 will magnetically influence the reed switch contacts 108 and 110 toward each other and close the circuit to the signal light 156. When such brake fluid level $L_2$ is reached, the circuit 150 is closed, energizing the signal lamp 156 and immediately warning the vehicle operator that the brake fluid level is reduced to a point where brake failure may and should be anticipated. The brake signal lamp 156 comes on and remains on, because there is no way to return the reed switch 100 to its original elevated position (unless the cover 32 is removed and the diaphragm lifted to equalize the pressure under the above the diaphragm body 72). The diaphragm 20, under atmospheric pressure admitted through the cover port 70, rests upon a level of brake fluid, when sufficiently depleted, at which the control magnet has coercive influence upon the reed switch contacts 108 and 110 to bring them into electrical connection.

The reed switch contact points and the control magnet should be selected for their relative magnetic field effects, with magnetic values such that, when the control magnet 120 is disposed in the reservoir and the brake fluid level is substantially at line $L_1$, the magnetic force field upon the contacts 108 and 110 is insufficient to close those normally open contacts. These magnetic field values can be provided by selectively engineering the relative sizes and configurations of the control magnet and the reed switch contacts and the distances between these component elements. Such specifications are readily determined by persons skilled in the art relating to such magnets and reed switch devices.

Although the specification and drawings herein describe and illustrate a master brake cylinder housing having a single reservoir, it is to be understood that the device and system of this invention are also applicable to and can be used in master brake cylinders having a plurality of brake fluid reservoirs, similar to those disclosed in our co-pending application Ser. No. 150,522 above referred to.

By these means, a system has been provided for early warning to the motor vehicle operator of a brake fluid condition indicating that brake failure will occur and should be anticipated unless brake fluid leakage is repaired and/or brake linings and facings replaced. The advantages of such a device and system are obvious and necessary to the proper operation of a motor vehicle and the safety and protection of the operator and passengers riding therein.

Although particular preferred forms or embodiments of the invention have been disclosed herein for purposes of explanation, further modifications or variations thereof after study of this specification, will or may become apparent to those skilled in the art to which the invention pertains. Reference should be had to the appended claims in determining the scope of the invention.

We claim:

1. A liquid level indicating device in a hydraulically operated vehicle brake system comprising in combination a master brake cylinder housing having a brake fluid reservoir, a removable cover for said housing overlying and forming a chamber above said reservoir, means removably securing said cover to said housing, means in said cover to admit air at atmospheric pressure to said chamber, a membrane secured by said cover upon said housing and having a portion thereof adapted to move responsively to and with the brake fluid level in said reservoir, said housing cover and said membrane defining said chamber, an electrical magnetically-responsive normally open switching device secured in said chamber to and upon said membrane portion, a control magnet for said switching device and support means therefor disposed in the brake fluid in said reservoir below said membrane, said switching device being connected to and in an electric circuit including a signalling element responsive to said switching device.

2. The device defined in claim 1, wherein
said switching device is normally disposed above the field of influence of said control magnet when the brake fluid is at normal level in said reservoir.

3. The device defined in claim 1, wherein
said control magnet support means comprises
a member having legs extending downwardly to and upon the bottom wall and at the sides of said reservoir,
said control magnet being disposed in magnetic alignment with and below said switching device.

4. The device defined in claim 1, wherein
said control magnet support means comprises a member having its ends secured at the top edge of said reservoir to said membrane and a medial web portion disposed in said brake fluid,
said control magnet being secured to said web portion in magnetic alignment with and under said switching device.

5. The device defined in claim 1, wherein
said control magnet is disposed below said switching device a distance such that the magnetic field of influence of said control magnet is inoperative to close said switching device when the brake fluid is at normal level in said reservoir.

6. The device defined in claim 1, wherein
said switching device support means comprises a flexible resilient diaphragm secured by and between said cover and the peripheral edge of said housing about said reservoir,
the medial portion of said diaphragm being adapted to rest and ride upon said brake fluid in said reservoir.

7. The device defined in claim 6, wherein
said diaphragm medial portion is provided with a recess,
said switching device being seated in said recess.

8. The device defined in claim 7, wherein
such switching device is adhesively secured to said diaphragm medial portion in said recess.

9. The device defined in claim 1, wherein
said switching device comprises a magnetically actuated reed switch.

10. The device defined in claim 9, wherein
said reed switch is biased to circuit-closing position by the coercive magnetic influence of said control magnet.

11. The device defined in claim 1, wherein
said electric circuit comprises
a source of electric power,
a vehicle ignition switch,
said signalling element,
said switching device,
and said master brake cylinder housing.

12. The device defined in claim 11, wherein
said signalling element comprises a visible signal lamp.

13. The device defined in claim 11, wherein
said control magnet has an effective magnetic influence upon said switching device directly related to a predetermined level of brake fluid in said reservoir at which said signalling element is to be energized.

14. The device defined in claim 1, wherein
said control magnet is spaced apart from and free of direct connection to said switching means,
said switching means being responsive to the magnetic field of influence produced by said control magnet at a lower predetermined brake fluid level.

15. The device defined in claim 9, wherein
said control magnet is spaced apart from and free of direct connection to said reed switch,
said reed switch being responsive to the magnetic field of influence produced by said control magnet at a lower predetermined brake fluid level.

16. The device defined in claim 9, wherein
said reed switch comprises an encapsulating housing,
and a pair of magnetically responsive switch contacts within said housing each connected to a conductor issuing from said housing,
one of said conductors being secured and grounded to said cover within said chamber by a connecting flexible grounding conductor,
the second of said conductors issuing from said chamber through said cover for connection to and in said electric circuit by a connecting flexible current conductor.

17. The device defined in claim 9, wherein
said reed switch comprises an encapsulating housing,
and a pair of magnetically responsive switch contacts within said housing each connected to a conductor issuing from said housing and terminating in a connected flexible conductor,
each of said flexible conductors being insulated and disposed within the body of said membrane,
one of said flexible conductors issuing from said membrane body and being grounded to said housing at an edge face of said membrane,
the second of said flexible conductors issuing from said membrane body at the side edge of said membrane for connection in and to said electric circuit.

18. The device defined in claim 1, and including
a magnetically responsive member secured and disposed in association with said switching device upon said membrane for improved response to the magnetic influence of said control magnet.

19. The device defined in claim 18, wherein
said magnetically responsive member comprises an iron or steel plate member disposed below said switching device upon said membrane.

20. The device defined in claim 18, wherein said magnetically responsive member comprises an iron or steel clip at least partially encircling the body of said switching device.

21. The device defined in claim 16, wherein said flexible grounding conductor terminates in a ground strap disposed in grounding contact with and under a peripheral edge of said cover and upon a peripheral edge of said membrane about said reservoir, and said flexible current conductor is electrically insulated and passes under said cover peripheral edge and said membrane peripheral edge and extends from said connected reed switch conductor to a point beyond said master brake cylinder housing for connection to and in said electric circuit.

* * * * *